United States Patent [19]

Kubo

[11] Patent Number: 4,599,531

[45] Date of Patent: Jul. 8, 1986

[54] ROTATION DETECTOR

[75] Inventor: Takashi Kubo, Yokosuka, Japan

[73] Assignee: Sony Corporation, Tokyo, Japan

[21] Appl. No.: 232,176

[22] Filed: Feb. 6, 1981

[30] Foreign Application Priority Data

Feb. 8, 1980 [JP] Japan ............................ 57-15020[U]
Feb. 29, 1980 [JP] Japan ................................. 57-25803

[51] Int. Cl.[4] .......................................... H02K 21/12
[52] U.S. Cl. .................................... 310/111; 310/155
[58] Field of Search ............... 310/156, 155, 154, 168, 310/111

[56] References Cited

U.S. PATENT DOCUMENTS 3,688,306  8/1972  Oishi et al. ...................... 310/168 X
3,728,565  4/1973  O'Callaghan ........................ 310/168
4,061,938  12/1977  Hashimoto ...................... 310/156 X Primary Examiner—Donovan F. Duggan
Attorney, Agent, or Firm—Lewis H. Eslinger; Alvin Sinderbrand

[57] ABSTRACT

A rotation detector for detecting the rotational speed and phase of the upper rotary drum of a guide drum of a VTR in respect to the stationary drum of the guide drum as the upper rotary drum rotates about its rotational axis, the rotation detector including a magnet mounted on the lower surface of the upper rotary drum along a first circumferential path which is coaxial with the rotational axis of the upper rotary drum, five yoke members mounted along the first circumferential path on the lower surface of the upper rotary drum with the magnet and each yoke member being equally spaced from one another along the first circumferential path, a first iron core having a coil wound about it mounted on the stationary drum along a second circumferential path which is coaxial with and opposing the first circumferential path for producing a signal corresponding to the rotational phase of the upper rotary drum in response to the passing of only the magnet during rotation of the upper rotary drum, and two second iron cores, each having a U-shaped configuration with a first leg including a magnet and a second leg having a coil wound about it, mounted along the second circumferential path of the stationary drum for producing a signal corresponding to the rotational speed of the upper rotary drum in response to the passing of the magnet and five yoke members during rotation of the upper rotary drum.

12 Claims, 13 Drawing Figures

FIG.1
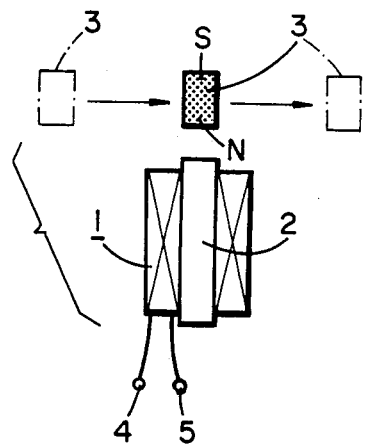
FIG.2 PRIOR ART
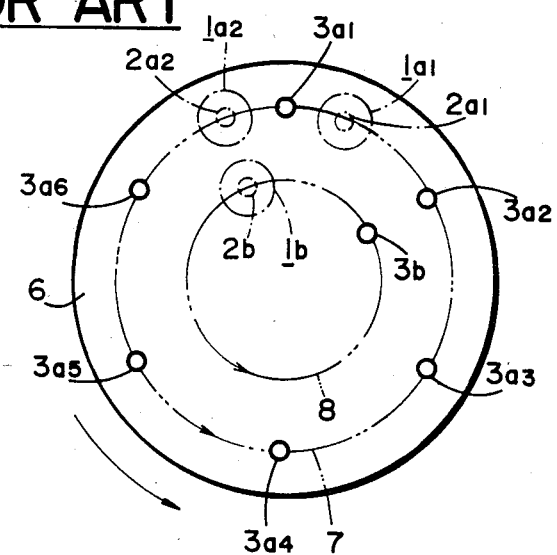
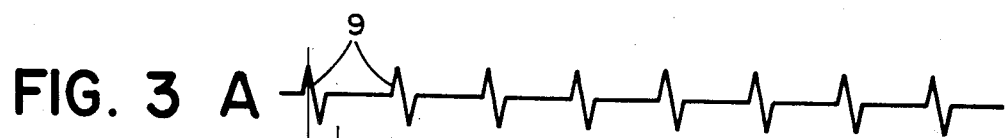
FIG. 3 A
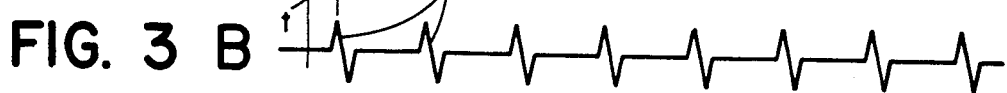
FIG. 3 B
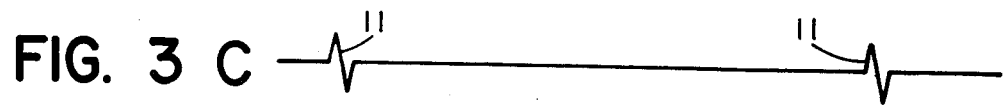
FIG. 3 C

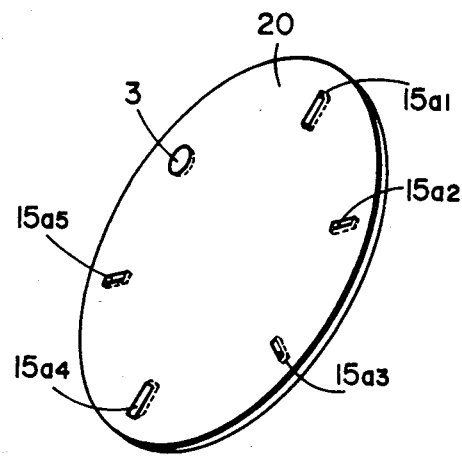
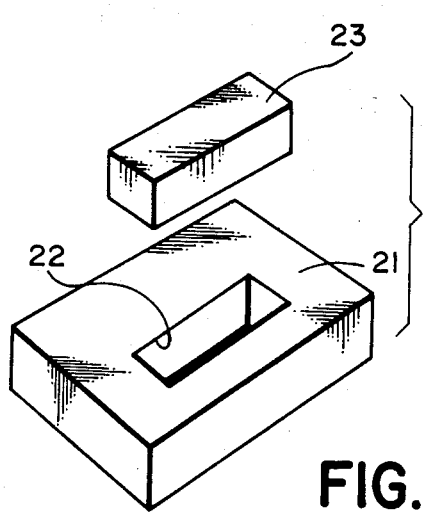
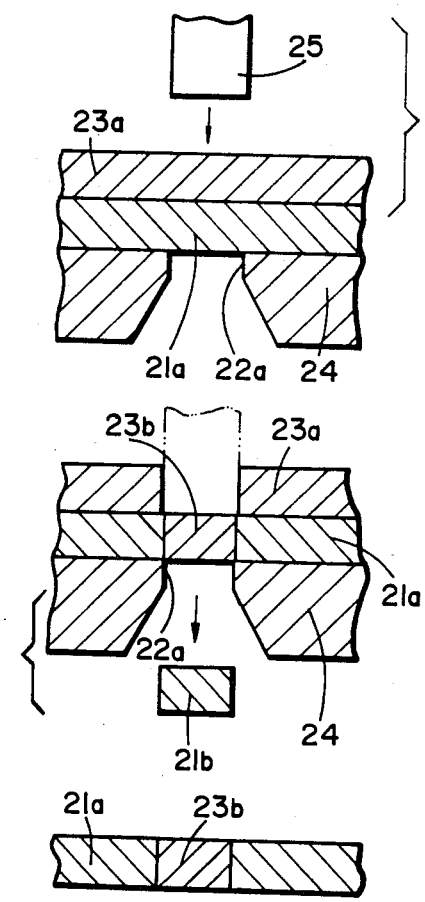
FIG. 7
FIG. 8
FIG. 9A
FIG. 9B
FIG. 9C

ROTATION DETECTOR

BACKGROUND OF THE INVENTION

1. Field of the Invention

The present invention relates to a rotation detector for detecting the rotational speed and phase of a rotary member and, in particular, is directed to a rotation detector having particular applicability as a pulse generator for a video tape recorder.

2. Description of the Prior Art

Generally, a video tape recorder (VTR) of the helical scan type includes a rotary magnetic head which records and/or reproduces video signals from a record medium, such as a magnetic tape. The magnetic head is generally mounted on a guide drum about which the tape is at least partially wrapped and, more particularly, about the upper rotary drum of the guide drum. A drum servo circuit is provided for controlling the rotational speed and phase of the upper rotary drum, and consequently, of the head. In this regard, the helical scan video tape recorder is provided with a rotation detector, that is, a pulse generator, for detecting the rotational speed and phase of the upper rotary drum.

Two types of pulse generators are known, both of which include three iron cores upon which coils are wound, with two iron cores being arranged on a rotary member, such as the upper rotary drum, along an outer circumferential path coaxial with the rotational axis of the rotary member and with third iron core being arranged on the rotary member along an inner circumferential path which is coaxial with the outer circumferential path. Such VTRs are also generally constructed with a rotary transformer disposed within the inner circumferential path to supply recording signals to the magnetic head secured to the upper rotary drum and to receive reproduced signals from the magnetic head. However, because of space limitations, it is difficult to arrange all of the coiled iron cores and the rotary transformer in a limited area on the upper rotary drum.

Further, a problem results with such conventional pulse generators in that part of the magnetic flux from a magnet disposed along one of the outer and inner circumferential paths for use with the coiled iron cores also affects the magnetic flux received by a coil disposed along the other of the outer and inner circumferential paths, thereby leading to a decrease in the S/N ratio of the output pulses therefrom. This defect may be prevented or controlled by enlarging the distance between the outer and inner coaxial circumferential paths along which magnets, yokes and coils are provided. However, such enlargement of the distance therebetween results in the size of the detector and rotary drum being rendered unnecessarily larger.

OBJECTS AND SUMMARY OF THE INVENTION

Accordingly, it is an object of the present invention to provide a rotation detector that avoids the above-described difficulties encountered with the prior art.

It is another object of the present invention to provide a rotation detector in which pulse producing elements thereof are disposed on a guide drum and arranged in a well-defined manner, with little or no interference therebetween.

It is a further object of the present invention to provide a rotation detector which is of a relatively small and compact size.

In accordance with an aspect of this invention, a rotation detector for detecting at least one of the rotational speed and phase of a rotary member in respect to a stationary member as the former rotates about a rotational axis thereof includes at least one magnet member mounted on one of the rotary member and stationary member along a first circumferential path only thereof which is coaxial with the rotational axis of the rotary member; at least one yoke member mounted on the one of the rotary member and stationary member along the first circumferential path only; at least one first core means, each having a coil wound thereabout, mounted on the other of the rotary member and stationary member along a second circumferential path only thereof which is coaxial with the first circumferential path, for producing a first signal in response to only one of the at least one magnet member and the at least one yoke member during rotation of the rotary member; and at least one second core means, each having a coil wound thereabout, mounted on the other of the rotary member and stationary member along the second circumferential path only, for producing a second signal in response to at least one of the at least one yoke member and the at least one magnet member during rotation of the rotary member.

The above, and other, objects, features and advantages of the present invention will become apparent in the following detailed description of illustrative embodiments of the invention which is to be read in connection with the accompanying drawings.

BRIEF DESCRIPTION OF THE DRAWINGS

FIG. 1 is a schematic side plan view illustrating the relationship betwen a magnet and coiled iron core of a first type of conventional pulse generator;

FIG. 2 is a schematic plan view of a rotation detector of the first type of conventional pulse generator;

FIGS. 3A, 3B and 3C are waveform diagrams illustrating the output signals from the pulse generator of FIG. 2;

FIG. 7 is a perspective view of a lower surface plate for use with the rotation detector according to the present invention;

FIG. 8 is a perspective view used for illustrating a conventional method for manufacturing the lower surface plate of FIG. 7; and FIGS. 9A, 9B and 9C are partial cross-sectional views used for illustrating steps according to this invention for manufacturing the lower surface plate of FIG. 7.

DETAILED DESCRIPTION OF THE PREFERRED EMBODIMENTS

Figure 4:
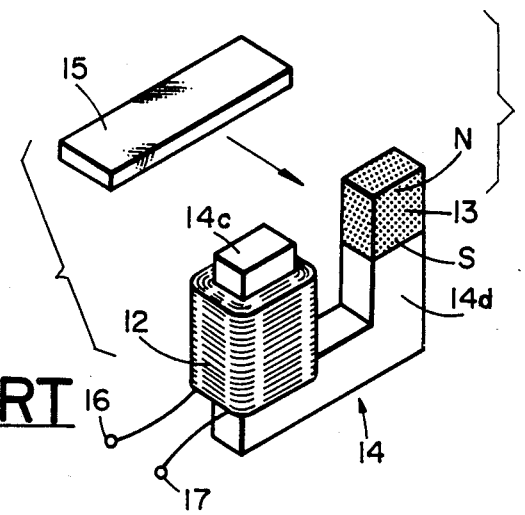
FIG. 4 is a perspective view illustrating the relationship between a yoke and a coiled iron core of a second type of conventional pulse generator.

Referring to the drawings in detail, and initially to FIGS. 1-5 thereof, there will first be described two types of conventional pulse generators, in order to distinctly point out and disclose the differences in construction, function and effect between the rotation detector according to the present invention and conventional pulse generators.

Referring first to FIGS. 1 and 2, a first conventional pulse generator is shown generally to include a coil 1 wound upon an iron core 2, the latter being fixed on the lower or stationary drum of the guide drum (not shown). A magnet 3 is mounted on the upper rotary drum 6 (FIG. 2) of the guide drum and is positioned to periodically pass over the coiled iron core 2 during rotation of upper rotary drum 6. In other words, magnet 3 is transferred in the direction indicated by the arrows in FIG. 1 to a position just over the coiled iron core 2 at which point the magnetic flux of magnet 3 converges on iron core 2, resulting in pulses being generated at terminals 4 and 5 of coil 1. Typically, in this first type of pulse generator, a plurality of coiled iron cores 2 and magnets 3 are employed. For example, as shown in FIG. 2, six magnets $3a_1$–$3a_6$ are mounted on the lower surface of upper rotary drum 6, or on a lower surface plate thereof, at substantially equally spaced positions so as to rotate along an outer circumferential path 7 which is coaxial with the rotational axis of upper rotary drum 6. Another magnet $3b$ is also mounted on upper rotary drum 6 so as to rotate along an inwardly-spaced circumferential path 7 during rotation of upper rotary drum 6.

A pair of coiled iron cores, that is, a first iron core $2a_1$ having a coil $1a_1$ wound thereupon and a second iron core $2a_2$ having a coil $1a_2$ wound thereupon, are positioned on the stationary drum (not shown) such that iron cores $2a_1$ and $2a_2$ both face or oppose each of the magnets $3a_1$–$3a_6$ during rotation of upper rotary drum 6. Thus, the two coiled iron cores $2a_1$ and $2a_2$ are positioned at different points along the same circumferential path 7 formed by the rotation of magnets $3a_1$–$3a_6$. In addition, another iron core $2b$ with a coil $1b$ wound thereupon is positioned on the stationary drum along the inner coaxial circumferential path 8 such that iron core $2b$ faces or opposes magnet $3b$ during rotation of upper rotary drum 6.

During rotation of upper rotary drum 6, magnets $3a_1$–$3a_6$ also rotate so as to be sequentially positioned over the coiled iron core $2a_1$, resulting in a pulse 9 being generated by coil $1a_1$, as shown in FIG. 3A, whenever one of the magnets $3a_1$–$3a_6$ passes over iron core $2a_1$. In a similar manner, as upper rotary drum 6 rotates, a pulse 10, as shown in FIG. 3B, is generated by coil $1a_2$ which is wound upon iron core $2a_2$, whenever one of the magnets $3a_1$–$3a_6$ passes over iron core $2a_2$. Accordingly, magnets $3a_1$–$3a_6$ result in the production of pulses 9 and 10, with a time difference t therebetween as will be defined hereinafter, whenever magnets $3a_1$–$3a_6$ pass over the coiled iron cores $2a_1$ and $2a_2$, respectively. This time difference t is determined by the duration required for each magnet $3a_1$–$3a_6$ provided on the outer circumferential path 7 to pass from the coiled iron core $2a_1$ to the second coiled iron core $2a_2$ during rotation of upper rotary drum 6 in the direction indicated by the arrow in FIG. 2. On the other hand, the coil $1b$ wound upon iron core $2b$ is positioned so as to generate only one pulse 11, as shown in FIG. 3C, whenever upper rotary drum 6 completes one 360° revolution. In other words, magnet $3b$ is mounted on the inner coaxial circumferential path 8 so as to pass over coil $2b$ as upper rotary drum 6 makes each 360° revolution. It should be appreciated that the time difference t between the first and second pulses 9 and 10, respectively, corresponds to the rotational speed of upper rotary drum 6 while pulse 11 corresponds to the rotational phase of upper rotary drum 6.

Figure 5:
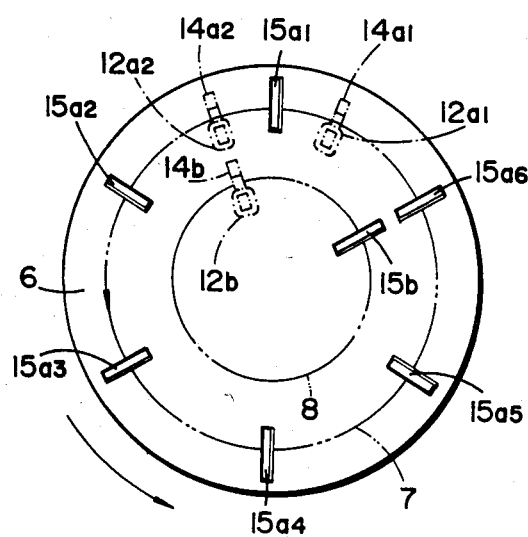
FIG. 5 is a schematic plan view of a rotation detector of the second type of conventional pulse generator.

Turning now to FIGS. 4 and 5, the second type of pulse generator includes a stationary iron core 14 of a square U-shaped configuration. One open end bar portion or leg $14c$ thereof has a coil 12 with terminals 16 and 17 wrapped therearound, and the other open end bar portion or leg $14d$ thereof is provided with a bias magnet 13. A yoke 15 is mounted on upper rotary drum 6 so as to pass over the stationary coiled portion $14c$ as the upper rotary drum rotates. With this construction, a pulse, for example, as shown in FIGS. 3A, 3B or 3C, is generated at terminals 16 and 17 of coil 12 as the yoke 15 passes over the coiled portion $14c$. This is because the magnetic flux from magnet 13 is converged by yoke 15, thereby causing an increase of flux passing through iron core 14.

Referring further to FIG. 5, upper rotary drum 6 has six yokes $15a_1$–$15a_6$ mounted along an outer circumferential path 7 on the lower surface of upper rotary drum 6, at substantially equally spaced intervals. Further, a yoke $15b$ is mounted along an inner coaxial circumferential path 8 on the lower surface of the upper rotary drum, in like manner to the embodiment of FIG. 2. A pair of coiled iron cores 14, that is, a first iron core $14a_1$ with a coil $12a_1$ wrapped therearound, and a second core $14a_2$ with a coil $12a_2$ wrapped therearound, are positioned, for example, on the lower stationary drum, so as to oppose and face yokes $15a_1$–$15a_6$ during rotation of upper rotary drum 6. A third iron core $14b$ with a coil $12b$ wrapped therearound is positioned, for example, on the lower stationary drum along the inner coaxial circumferential path 8 so as to oppose and face the inner yoke $15b$ as upper rotary drum 6 rotates. Since the coiled iron cores $14a_1$, $14a_2$ and $14b$ are each provided with a magnet 13, pulses 9, 10 and 11, as shown in FIGS. 3A, 3B and 3C, respectively, are formed by the respective coils $12a_1$, $12a_2$ and $12b$ during rotation of upper rotary drum 6.

Figure 6:
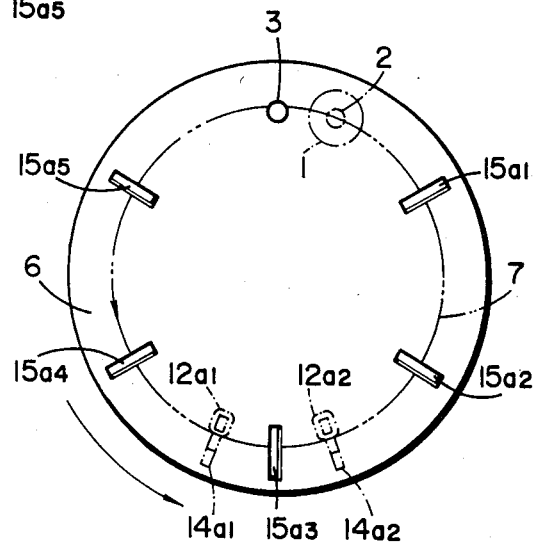
FIG. 6 is a schematic plan view of a rotation detector according to one embodiment of the present invention.

Referring now to FIG. 6, one embodiment of a rotation detector according to this invention will now be described, with various elements corresponding to those described above with reference to the known rotation detectors of FIGS. 1–5 being identified by the same reference numerals. Further, a duplicate explanation of the elements in common with those in FIGS. 1–5 will be omitted if possible for the sake of brevity. As shown in FIG. 6, upper rotary drum 6 is provided at its lower surface with one magnet 3 and five yokes $15a_1$–$15a_5$ which are mounted at substantially equally spaced distances from each other along an outer circumferential path 7 of upper rotary drum 6. A stationary drum (not shown) is mounted opposite or facing the lower or bottom surface of upper rotary drum 6 in a spaced relationship thereto. The stationary drum is provided at predetermined positions along the same circumferential path 7 with an iron core 2 having a coil 1 wound thereupon and with a pair of coiled iron cores $14a_1$ and $14a_2$. The former coiled iron core 2 may be constructed by winding the coil 1 upon iron core 2 as shown in FIG. 1, and the pair of coiled iron cores 14, that is, the first iron core $14a_1$ and the second iron core $14a_2$ are each constructed with corresponding coils $12a_1$ and $12a_2$ wound thereupon, respectively, in the same manner as shown in FIG. 4. These coiled iron cores 2, $14a_1$ and $14a_2$ are positioned so as to face or oppose magnet 3 and yokes $15a_1$–$15a_5$ on the identical circumferential path 7, during rotation of upper rotary drum 6. It is to be appreciated, however, that the elements mounted on the stationary drum, that is, iron cores 2, 14a, and 14a₂, could be mounted on the upper rotary drum 6, if the elements mounted on upper rotary drum 6, that is, magnet 3 and yokes 15a–15a₅, are mounted on the stationary drum. In other words, the positioning of the elements on the upper rotary drum 6 and the stationary drum could be reversed from that shown in FIG. 6.

As upper rotary drum 6 rotates in the direction indicated by the arrow in FIG. 6, magnet 3 and yokes $15a_1$–$15a_5$ rotate with upper rotary drum 6 along the circumferential path 7 around the rotational axis of the upper rotary drum. During such rotation, magnet 3 and yokes $15a_1$–$15a_5$ pass over the first and second coiled iron cores $14a_1$ and $14a_2$, resulting in coils $12a_1$ and $12a_2$ producing the wave forms or pulses 9 and 10, respectively, as shown in FIGS. 3A and 3B. In other words, each pulse 9, as shown in FIG. 3A, is produced by the first coiled iron core $14a_1$ whenever magnet 3 or one of yokes $15a_1$–$15a_5$ passes thereover. The distance between adjacent pulses 9 corresponds to a time difference required for adjacent elements, that is, magnet 3 and yokes $15a_1$–$15a_5$, which result in the production of the adjacent pulses 9, to pass over the coiled iron core $14a_1$. In this manner, during each rotation of 360° of upper rotary drum 6, the waveform having six pulses 9 (FIG. 3A) is produced by coil $12a_1$. In a similar manner, the waveform having pulses 10 is generated by coil $12a_2$ which is wound upon iron core $14a_2$ as magnet 3 and yokes $15a_1$–$15a_5$ pass over coil $12a_2$. It should be appreciated that each pulse 10 follows a respective pulse 9 with a time difference t therebetween, as shown in FIG. 3B, which can be defined by the duration required for the magnet 3 or yoke $15a_1$–$15a_5$ that produced the respective pulse 9 to pass from the coil $12a_1$ to the coil $12a_2$. Thus, as upper rotary drum 6 completes one full revolution, a waveform having six pulses 10 is formed with each pulse 10 lagging behind a respective pulse 9 by the time difference t.

On the other hand, as magnet 3 passes over coil 1 which is wound upon iron core 2, a single pulse 11, as shown in FIG. 3C, is produced by coiled iron core 2. However, no pulse is produced when yokes $15a_1$–$15a_5$ pass over iron core 2. Accordingly, the coiled iron core 2 produces only a single pulse 11, as shown in FIG. 3C, for each 360° revolution of upper rotary drum 6. It should be appreciated that it is unnecessary to position iron core 2 so that the phase of pulse 11 corresponds to every sixth pulse 10, as shown in FIG. 3B, although this is specifically shown in the drawings. In other words, coil 1 and iron core 2 may be positioned at different locations than those shown in FIG. 6, whereby pulse 11 is out of phase with pulses 10. Thus, since the present invention does not require accurate positioning of the various pulse producing elements, it becomes extremely simple to construct and design in comparison to conventional pulse generators. It should be appreciated that, in accordance with the present invention, the number of magnets 3 and coiled iron cores 2 may be increased and the number of yokes $15a_1$–$15a_5$ and coiled iron cores $14a_1$ and $14a_2$ may be increased or decreased, as necessary.

It is to be noted from the above description of the embodiment in accordance with the present invention that the rotation detector according to the present invention has the advantages of being relatively easy to design and assemble since no elements need be mounted along a second inner, coaxial circumferential path as with conventional pulse generators. Another advantage afforded by the construction and embodiment of the rotation detector according to the present invention is the lack of any interference by the leakage of magnetic flux from the inner (outer) magnet on the outer (inner) magnet as with conventional pulse generators, since all elements are mounted along the identical circumferential path, resulting in an increased S/N ratio for the output. A further advantage is that pulse forming elements mounted along the outer coaxial circumferential path have a faster angular velocity so that sharper pulses can be obtained in comparison with elements mounted along the inner coaxial circumferential path as in conventional pulse generators. Accordingly, the determination of rotational speed and phase can be provided with greater accuracy than in the case where pulse forming elements are also mounted along the inner coaxial circumferential path.

Magnet 3 and yokes $15a_1$–$15a_5$ may be provided on the lower surface of upper rotary drum 6 by means of a lower surface plate 20 on which they are mounted or attached, as shown in FIG. 7. Further, conventional procedures for manufacturing plates such as the lower surface plate 20 may be used in which plate members 23 and any other suitable elements, such as magnet 3 and yokes $15a_1$–$15a_5$, are pressed into or attached with an adhesive to the lower surface plate. For example, as shown in FIG. 8, a portion 21 of the lower surface plate may first be provided with a groove or aperture 22 by any suitable means, with the groove having a shape and size so as to be adapted to tightly receive a plate member 23 (or magnet 3 or yoke $15a_1$–$15a_5$) to be inserted thereinto. Such conventional procedures generally require a number of steps to form a plate such as the lower surface plate 20, that is, punching a groove or aperture 22 into the portion 21 of lower surface plate 20 and then adhering or tightly pressing a plate member 23 (or magnet 3 or yoke $15a_1$–$15a_5$) into aperture 22. With this method, strict accuracy in shape and dimension is required for aperture 22 and plate member 23 so as to require laborious work and skill in the manufacturing process.

Referring now to FIGS. 9A, 9B and 9C, an improved method of manufacturing, for example, a plate 20 as shown in FIG. 7, will now be described. Turning first to FIG. 9A, a sheet of plate member material 23a constituting the plate member 23 is superimposed (but not fixed) on the upper surface of a sheet of base plate material 21a constituting lower surface plate 20 which, in turn, is placed on a die 24 having an aperture 22a and substantially corresponding in shape and size to the plate member 23 to be secured to the base plate material 21a. The base plate material 21a may, for example, be of a non-magnetic metal material, such as aluminum or the like, and the plate member material 23a may, for example, be of a magnetic metal material such as iron, permalloy or the like, although the hardness of the plate member material 23a is preferably greater than that of the base plate material 21a. The thickness $t_1$ of the base plate material 21a, in a preferred embodiment, is substantially the same as the thickness $t_2$ of the plate member material 23a, although the thicknesses $t_1$ and $t_2$ may be different.

A punching rod 25 of a punching machine (not shown) is provided to punch out portions 23b and 21b from plate member material 23a and base plate material 21a, respectively. Preferably, the cross-sectional size of aperture 22a is substantially the same or slightly larger than that of portion 21b punched out from the base plate material 21a so that portion 21b can be removed from die 24. However, it is preferred that the size of aperture 22a of die 24 is slightly smaller than that of punching rod 25, and consequently, of portion 23b which is substituted for portion 21b, the latter being punched out from the base plate material 21a by the force of the plate member portion 23b and punching rod 25. In this manner, portion 23b is tightly fit within the aperture formed by portion 21b.

The improved method as hereinabove set forth has the advantages in that lower surface plate 20 can be manufactured by a much simpler procedure with greater accuracy in size, shape and positioning than in the aforementioned conventional method. It is to be further noted that this improved method of manufacturing the plate 21 with a plate member 23 pressed thereinto can be used to prepare the necessary plates which have been employed in conventional pulse generators or the like. It is also noted, however, that where the material used as the base plate material is much harder than that used for the plate member to be inserted thereinto, the plate member material cannot be punched into the base plate material as described above. In such case, the plate member may be inserted into the base plate material in a conventional manner, for example, by first punching an aperture in the base plate material and then pressing the plate member thereinto or adhering it thereto. However, the improved method as described above has the advantages that when at least one plate member is made of a material harder than the material of the lower surface plate, such method can save laborious and skilled work which is required with conventional methods.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A rotation detector for detecting at least one of the rotational speed and phase of a rotary member in respect to a stationary member as the former rotates about a rotational axis thereof, comprising:
   at least one magnet member mounted on one of said rotary member and stationary member along a first circumferential path only thereof which is coaxial with the rotational axis of said rotary member;
   at least one yoke member mounted on said one of said rotary member and stationary member that said at least one magnet member is mounted on and along said first circumferential path only;
   at least one first core means, having a coil wound thereabout, mounted on the other of said rotary member and stationary member that said at least one magnet member is not mounted on and along a second circumferential path only thereof which is coaxial with said first circumferential path, for producing a first signal in response to only one of said at least one magnet member and said at least one yoke member during rotation of said rotary member; and
   at least one second core means, each having a coil wound thereabout, mounted on the other of said rotary member and stationary member that said at least one magnet member is not mounted on and along said second circumferential path only, for producing a second signal in response to at least one of said at least one yoke member and said at least one magnet member during rotation of said rotary member.

2. The rotation detector according to claim 1; in which said at least one magnet member is comprised of only one magnet member, said at least one yoke member is comprised of a plurality of yoke members, said at least one first core means is comprised of only one first core means for producing said first signal in response to only said one magnet member, and said at least one second core means is comprised of a plurality of second core means for producing said second signal in response to said one magnet member and said plurality of yoke members.

3. The rotation detector according to claim 2; in which said plurality of yoke members is comprised of five yoke members and each of said five yoke members and said one magnet member are substantially equally spaced from one another along said first circumferential path.

4. The rotation detector according to claim 3; in which said plurality of second core means is comprised of two second core means, each including a first leg having a magnet and a second leg having a coil wound therabout.

5. The rotation detector according to claim 2; in which said one magnet member and said plurality of yoke members are mounted on said rotary member, and said one first core means and said plurality of second core means are mounted on said stationary member.

6. The rotation detector according to claim 5; in which said rotary member includes a lower plate member on which said one magnet member and said plurality of yoke members are mounted.

7. The rotation detector according to claim 6; in which said one magnet member and said plurality of yoke members are formed integrally with said lower plate member.

8. The rotation detector according to claim 7; in which said one magnet member and said plurality of yoke members are each pressed into said lower plate member so as to be integrally formed therewith.

9. The rotation detector according to claim 1; in which said rotary member is an upper rotary drum of a guide drum of a video tape recording and/or reproducing apparatus and said stationary member is a lower stationary drum of said guide drum.

10. A rotation detector for detecting at least one of the rotational speed and phase of a rotary member in respect to a stationary member as the former rotates about a rotational axis thereof, comprising:
   at least one magnet member mounted on one of said rotary member and stationary member along a first circumferential path thereof which is coaxial with the rotational axis of said rotary member;
   at least one yoke member mounted on said one of said rotary member and stationary member that said at least one magnet member is mounted on and along said first circumferential path;
   at least one first core means, each having a coil wound thereabout, mounted on the other of said rotary member and stationary member that said at least one magnet member is not mounted on and along a second circumferential path thereof which is coaxial with said first circumferential path, for producing a first signal in response to only one of said at least one magnet member and said at least one yoke member during rotation of said rotary member; and at least one second core means, each having a coil wound thereabout, mounted on the other of said rotary member and stationary member that said at least one magnetic member is not mounted on and along said second circumferential path, for producing a second signal in response to both of said at least one yoke member and said at least one magnet member during rotation of said rotary member.

11. The rotation detector according to claim 1; in which said second circumferential path is in opposing relation to said first circumferential path.

12. The rotation detector according to claim 10; in which said second circumferential path is in opposing relation to said first circumferential path.

* * * * *